(12) United States Patent
Isaacs et al.

(10) Patent No.: US 8,992,379 B2
(45) Date of Patent: Mar. 31, 2015

(54) INTEGRATED HYDRAULIC HYBRID DRIVETRAIN SYSTEM

(75) Inventors: Robert L. Isaacs, Buffalo, MN (US); Benjamin M. Hoxie, Plymouth, MN (US)

(73) Assignee: Eaton Corporation, Cleveland, OH (US)

( * ) Notice: Subject to any disclaimer, the term of this patent is extended or adjusted under 35 U.S.C. 154(b) by 165 days.

(21) Appl. No.: 13/283,043

(22) Filed: Oct. 27, 2011

(65) Prior Publication Data

US 2012/0129648 A1   May 24, 2012

Related U.S. Application Data

(60) Provisional application No. 61/407,190, filed on Oct. 27, 2010.

(51) Int. Cl.
*B60W 20/00*  (2006.01)
*F16H 37/08*  (2006.01)
(Continued)

(52) U.S. Cl.
CPC .......... *B60K 6/12* (2013.01); *B60K 2006/4808* (2013.01); *B60W 10/02* (2013.01); *B60W 10/04* (2013.01); *B60W 10/11* (2013.01); *B60W 10/24* (2013.01); *B60W 30/18018* (2013.01); *B60W 30/186* (2013.01); *B60W 30/19* (2013.01); *B60Y 2200/143* (2013.01); *B60Y 2200/144* (2013.01); *Y02T 10/6208* (2013.01); *Y02T 10/626* (2013.01); *Y10T 74/19051* (2013.01); *Y10T 477/20* (2013.01)
USPC ................. 477/6; 475/203; 475/302; 74/329; 60/416

(58) Field of Classification Search
USPC ............ 477/6, 52, 5; 475/198, 199, 202, 203, 475/602, 314; 74/329, 335, 336 R; 60/415, 60/416
See application file for complete search history.

(56) References Cited

U.S. PATENT DOCUMENTS 3,906,817 A * 9/1975 Kreitzberg ....................... 74/745
4,095,675 A * 6/1978 Bell ............................ 184/6.12
(Continued)

FOREIGN PATENT DOCUMENTS

JP            S6239327 A  *  2/1987
WO   WO 2009/147501 A2    12/2009

OTHER PUBLICATIONS

International Search Report and Written Opinion mailed Feb. 7, 2012.

*Primary Examiner* — Roger Pang
(74) *Attorney, Agent, or Firm* — Merchant & Gould P.C.

(57) ABSTRACT

A hybrid drivetrain for a motor vehicle includes an automated mechanical transmission (AMT) having an output shaft. The drivetrain includes an alternative energy source including a motor and an energy storage unit and two torque transfer arrangements. The first transfer arrangement is separate from engageable gear sets of the AMT for transferring torque from the output shaft to a motor when the energy storage unit is being charged and for transferring torque from the motor to the output shaft when the energy storage unit is being discharged. Additionally, an alternative energy source clutch for selectively coupling the first torque transfer arrangement to the output shaft is included. The second torque transfer arrangement is for transferring torque from the output shaft to a driven axle of the motor vehicle. At least one of the first and second torque transfer arrangements has different first and second torque transfer ratios.

16 Claims, 3 Drawing Sheets

(51) Int. Cl.
*B60K 6/12* (2006.01)
*B60W 10/02* (2006.01)
*B60W 10/04* (2006.01)
*B60W 10/11* (2012.01)
*B60W 10/24* (2006.01)
*B60W 30/18* (2012.01)
*B60W 30/186* (2012.01)
*B60W 30/19* (2012.01)
*B60K 6/48* (2007.10)

(56) References Cited

U.S. PATENT DOCUMENTS

| | | | |
|---|---|---|---|
| 4,242,922 A * | 1/1981 | Baudoin | 477/68 |
| 4,993,780 A * | 2/1991 | Tanaka et al. | 303/3 |
| 5,836,848 A * | 11/1998 | Janiszewski et al. | 475/204 |
| 5,888,165 A * | 3/1999 | Besler et al. | 475/204 |
| 6,117,038 A * | 9/2000 | Nishiji et al. | 475/221 |
| 7,082,757 B2 | 8/2006 | Teslak et al. | |
| 8,302,720 B2 * | 11/2012 | Rose et al. | 180/167 |
| 2003/0104901 A1 | 6/2003 | Fukushima et al. | |
| 2006/0060398 A1 | 3/2006 | Bitsche et al. | |
| 2007/0087888 A1 | 4/2007 | Kelley, Jr. | |
| 2008/0176699 A1 * | 7/2008 | Stecklein | 475/72 |
| 2008/0277230 A1 * | 11/2008 | Youtt | 192/57 |
| 2009/0062054 A1 * | 3/2009 | Brentnall | 475/225 |
| 2010/0141024 A1 * | 6/2010 | Fouquet et al. | 303/15 |
| 2011/0125356 A1 * | 5/2011 | Takahashi | 701/22 |
| 2011/0126652 A1 | 6/2011 | Genise et al. | |
| 2013/0068056 A1 * | 3/2013 | Van Batavia et al. | 74/335 |

* cited by examiner

INTEGRATED HYDRAULIC HYBRID DRIVETRAIN SYSTEM

CROSS-REFERENCE TO RELATED APPLICATIONS

This application claims priority to and the benefit of U.S. Provisional Patent Application Ser. No. 61/407,190, filed Oct. 27, 2010, and entitled "Integrated Hydraulic Hybrid Drivetrain System," the disclosure of which is hereby incorporated by reference herein in its entirety.

INTRODUCTION

Historically, automated mechanical transmissions (AMTs) have not been utilized in many applications due to maintenance and performance concerns. The main clutch wear rate can be high due to frequent starts/stops and the torque drop-out between gear ratio changes is not desirable. The addition of a hybrid device that provides torque during launch and gear shifts mitigates the shortcomings of an AMT. However, current hybrid devices, which all have a fixed gear ratio, cannot achieve the appropriate combination of torque capacity and speed range to accomplish the task within economical reason. In a traditional launch from a stop, an AMT engages the main clutch and accelerates the vehicle with torque transferred from the engine through the clutch via friction. This friction creates heat and wears the clutch.

One hydraulic hybrid system, known as a hydraulic launch assist (HLA) system, has been adapted for commercial vehicles and increases fuel economy and acceleration compared to vehicles not so equipped, particularly when used in applications having frequent starting and stopping and low-speed operation, such as city buses and refuse collection trucks. However, HLA systems are typically used in combination with conventional automatic transmissions employing a torque converter to communicate driving torque from an engine to the transmission. The torque converter facilitates starting the vehicle from a stopped condition without the need to gradually engage a clutch, and the torque converter also provides torque multiplication when there is a significant speed ratio across the torque converter. At low speed operation, the torque converter losses are a much more significant portion of the power from the engine. A countershaft transmission, and more particularly an AMT, equipped with a plate clutch for transmitting torque, is significantly more efficient at low speed and start-stop operation than a torque converter transmission, and weighs less than a torque converter transmission. However, typical dry friction clutch plates or driven discs wear out undesirably quickly under such operating conditions. Additionally, the rate of acceleration when starting from a stop is typically less for an AMT equipped vehicle than a torque converter/automatic transmission equipped vehicle in part because of the torque multiplication benefit conferred by a torque converter. Other types of hybrid drivetrain systems are depicted in U.S. Patent Publication No. 2011/0126652, the disclosure of which is hereby incorporated by reference herein in its entirety.

SUMMARY

In one aspect, the technology relates to a hybrid drivetrain for a motor vehicle, the hybrid drivetrain including: an automated mechanical transmission having an input shaft, an output shaft, and a counter shaft, the automated mechanical transmission also including a first gear disposed between the input shaft and the countershaft and at least two selectively engageable gear sets disposed between the countershaft and the output shaft; a master clutch for selectively coupling the input shaft of the automated mechanical transmission to a main power source; an alternative energy source including a motor and an energy storage unit; a first torque transfer arrangement separate from the engageable gear sets of the automated mechanical transmission for transferring torque from the output shaft of the automated mechanical transmission to the motor when the energy storage unit is being charged and for transferring torque from the motor to the output shaft of the automated mechanical transmission when the energy storage unit is being discharged; an alternative energy source clutch for selectively coupling the first torque transfer arrangement to the output shaft of the automated mechanical transmission; a second torque transfer arrangement for transferring torque from the output shaft of the automated mechanical transmission a driven axle of the motor vehicle; at least one of the first and second torque transfer arrangements having first and second torque transfer ratios, the first and second torque transfer ratios being different from one another.

In another aspect, the technology relates to a drivetrain for a motor vehicle including: a mechanical transmission having an input shaft, an output shaft, and a plurality of selectively engageable gears located between the input shaft and the output shaft; a torque transfer mechanism for transferring energy at least one of to or from the output shaft, the torque transfer mechanism having a selectively engageable clutch for engaging the torque transfer mechanism to the output shaft; an energy storage unit having an accumulator and a pump for charging the accumulator with hydraulic fluid based at least in part on a rotation of the torque transfer mechanism; and a multiple-ratio axle transversely coupled to the output shaft, wherein the multiple-ratio axle has a selectively engageable high ratio gear and a selectively engageable low ratio gear.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The technology provides a hybrid drivetrain solution that increases fuel economy significantly above that of the currently available technology. The currently available hybrid drivetrain solution includes a traditional torque converter driven automatic transmission (TCA) driven drivetrain with a fixed ratio axle and separate hybrid device in parallel. Significantly higher fuel savings can be realized by replacing the inefficient TCA with an automated mechanical transmission (AMT). In certain embodiments, a multiple-ratio axle (e.g., a multiple use ratio rear differential) is used to increase both speed and torque range of the hybrid device. The combination and integration of the AMT, hybrid device, and multiple-speed axle yields a drivetrain system that saves significantly more fuel than the current state of the art parallel hybrid system.

One embodiment of the technology includes a main clutch, AMT, and multiple-ratio axle in series, with the hybrid device in parallel to the driveline. The hybrid device captures energy during vehicle deceleration that is normally dissipated as heat in the vehicle brakes. This captured energy is released such that fuel savings and performance are increased, and main clutch wear is greatly decreased.

The proposed hybrid is coupled to the driveline and may launch the vehicle on its own. The main clutch is engaged once the differential speed across the clutch is at or near zero. The hybrid also applies torque to the driveline when the transmission is making gear shifts, eliminating the torque drop-out of a traditional AMT. The ability to create enough torque to effectively launch the vehicle with an economically sized hybrid device is made possible by utilizing a deep ratio in a multiple-ratio rear axle during launch mode. Similarly, to increase the operational speed range of the hybrid device during regenerative braking (i.e., deceleration) mode, a faster ratio is utilized. Operating at higher speed allows for greater energy capture and thus greater fuel savings and brake wear reduction.

Figure 1:
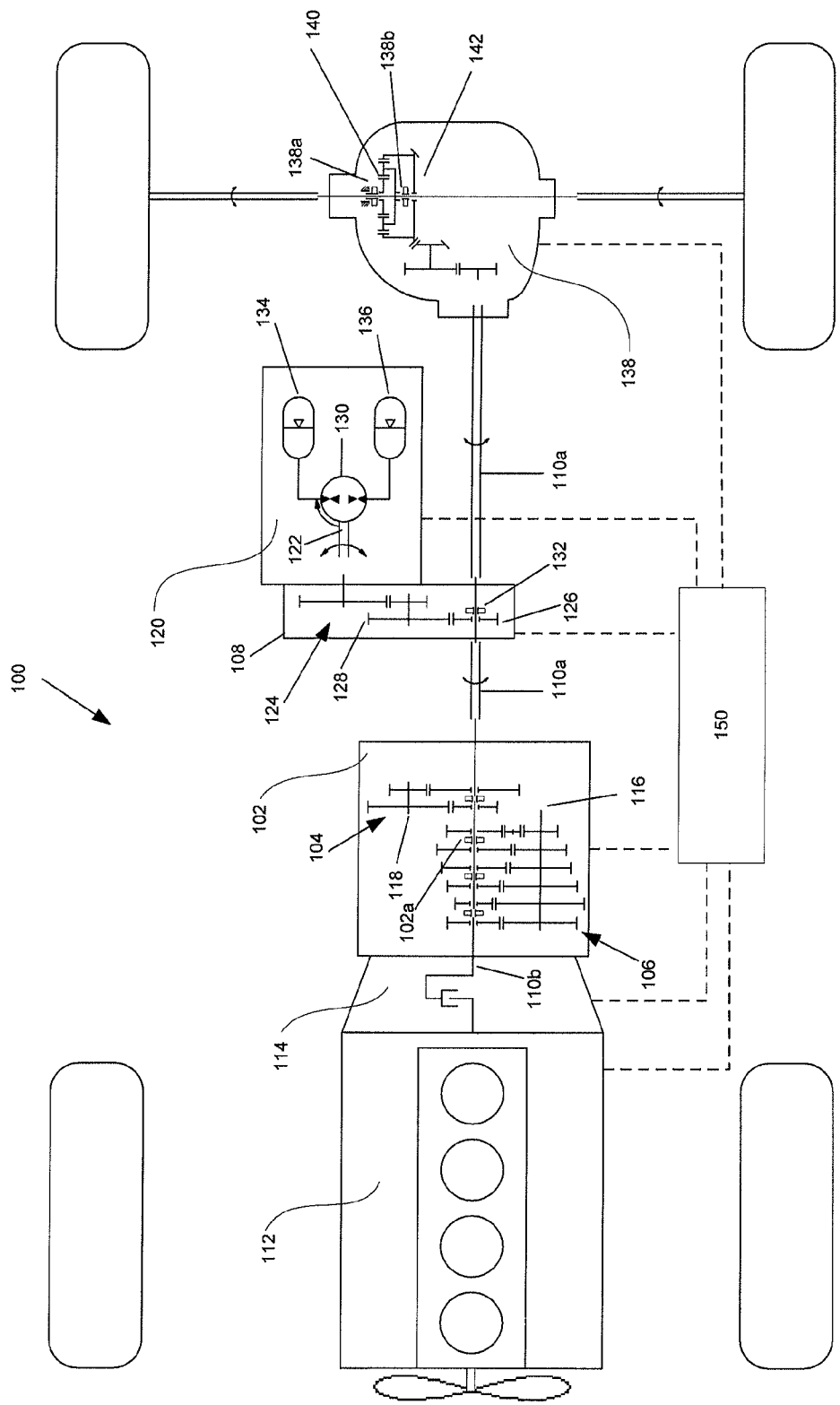
FIG. 1 depicts a hybrid drivetrain.

One embodiment of such a hybrid device is depicted in FIG. 1. The hybrid hydraulic drivetrain 100 includes an automated manual transmission 102 that includes an auxiliary section or gear set 104 fixed directly to an end of a primary gear set 106. The gear sets 104, 106 include selectively engageable gears. A transfer case or other torque transfer arrangement 108 is located proximate the auxiliary gear set 104, opposite the primary gear set 106. In this configuration, the transfer case 108 is discrete from the transmission 102, which improves performance of the system 100, as well as increases ease of manufacturability and serviceability. An output shaft 110 connects the transmission 102 to the transfer case 108.

The primary gear set 106 has an input shaft 110b and is selectively connectable to a main power source such as an engine 112 via a main or master clutch 114. The main clutch 114 may be a plate-type clutch, dry clutch, or other type of clutch device, as required or desired for a particular application. A countershaft 116 may be used to drive auxiliary equipment. The primary gear set 106, by way of example only, may provide five selectable forward drive gear ratios and one reverse gear drive ratio. In the depicted embodiment, four clutches 102a for selectively engaging any of the desired gears in gear sets 104, 106 are used. Any number of gear/clutch pairings may be utilized in other embodiments. A headset of meshed gears provides driving engagement between an input shaft 110b and a countershaft 116. Gears on the output shaft 110a are in mesh with gears on the countershaft 116, which may be used for shifting the gears in the transmission 102. Additionally, the countershaft 116 may be used to drive auxiliary vehicle components. Slideable dog clutches are used to fix the gears to the shaft on which they are disposed to achieve the targeted gear ratio.

The auxiliary gear set 104, in the exemplary embodiment a range box, is coupled to the primary gear set 106 by the output shaft 110a, providing up to an additional two ratios for each forward and reverse gear ratio. The number of ratios available in each section is not critical to the technology. The auxiliary gear set 104 has a countershaft 118 for shifting gears and/or driving auxiliary equipment.

The system 100 includes an energy storage unit, also referred to as an alternative energy source or a hybrid system 120, that includes an input shaft 122. The input shaft 122, and therefore the hybrid system 120, is therefore in parallel with the output shaft 110a. The transfer case 108 connects the hybrid system 120 to the output shaft 110a. It includes a transfer gear set 124 having a first transfer gear and a second transfer gear 126 and 128 respectively. It should be appreciated that any known arrangement for transferring speed and torque between parallel shafts can be employed in place of the transfer gear set 124, such as more complicated gear sets, or a sprocket and chain combination, potentially in combination with other fixed ratio mechanisms.

The first transfer gear 126 is located on the output shaft 110 and may be connected to the input shaft 122 by another gear set, drive chain and sprocket combination, or any other mechanism known in the art. In the depicted embodiment, the first transfer gear 126 is directly drivingly connected to input shaft 122 of the hybrid system 120. The first transfer gear 126 is engaged with a transfer case clutch 132. The transfer case clutch 132 (also referred to as an alternative energy source clutch) is coaxial with first transfer gear 126 and selectively connects first transfer gear 126 to output shaft 110. The transfer case clutch 132 provides a selective driving connection between output shaft 110a and the hybrid system input shaft 122.

The transfer case clutch 132 may be a slider or dog-tooth type clutch. Such a clutch has the benefit of being self-contained, requiring little energy to operate, and permitting no slippage when engaged. The transfer case clutch may also be a plate type clutch. The transfer case clutch 132 can be controlled by any mechanism suitable for axially displacing a clutch sleeve. Such mechanisms are well known in the art of transmissions, and include pneumatically, hydraulically and electrically actuated shift forks. Schemes for direct displacement through electromagnetic means are also known in the art.

The hybrid system 120 includes a pump/motor unit 130 and both a high pressure accumulator 134 and a reservoir or low pressure accumulator 136. In certain embodiments, the maximum pressure of the high pressure accumulator 134 may be whatever is needed for a particular application, but pressures of up to and in excess of about 5000 psi are contemplated; the maximum pressure of the low pressure accumulator 136 may be 100 psi, again as needed for a particular application. In other embodiments, the low pressure accumulator 136 is a fluid reservoir at atmospheric pressure. The hybrid system 130 may function as described in U.S. Pat. No. 7,082,757, the disclosure of which is hereby incorporated by reference herein in its entirety. Alternate functionalities are also contemplated. In a "charging" or "regeneration" mode, torque is applied to input shaft 122 of both the hybrid system 120 and pump/motor unit 130 with pump/motor unit 130 operating in a pump mode. In the pump mode, pump/motor unit 130 draws hydraulic fluid from low pressure accumulator 136 and forces it into high pressure accumulator 134 where the fluid is retained under significant pressure. This charging mode typically occurs when the vehicle is decelerating or slowing. In a "discharging" or "driving" mode of the hybrid system 120, pump/motor unit 130 operates in a motor mode. In the motor mode, pressurized fluid from the high pressure accumulator 134 acts on pump/motor unit 130 to induce a torque on input shaft 122, thus causing shaft 122 to rotate. Fluid exiting pump/motor unit 130 enters low pressure accumulator 136. Torque is transferred to the output shaft 110a, via the transfer case 108. This driving mode typically occurs when the vehicle is starting from a stopped position or otherwise accelerating.

Unlike some prior art systems, such as that disclosed in U.S. Patent Application No. 2011/0126652, the depicted system 100 utilizes a single point of connection to the transmission 102 and vehicle. That is, the system 100 includes a transfer gear 126 to both transfer hybrid energy to the rear axle 138 (during launching and shifting), as well as to capture energy from the transmission 102 (during deceleration and braking).

The system 100 also includes a torque transfer arrangement, embodied in a multiple-ratio axle or rear differential 138 connected to the output shaft 110a, located past the transfer case 108. The depicted embodiment includes a high ratio gear 140, a low ratio gear 142, and respective clutches 138a to selectively engage the gears 140, 142 to transfer torque from the output shaft 110a to the vehicle drive axle. The high ratio gear 140 provides higher torque and lower speed to the vehicle axle, while the low ratio gear provides lower torque and higher speed. Although a single ratio axle may instead be used, the multiple-ratio axle improves the launching ability of the system 100, wherein the hybrid system 120 may be used alone to launch the vehicle. When launching (described below) the lower gear ratio is first utilized, with the larger gear ratio used towards the end of the launch sequence.

Figure 2:
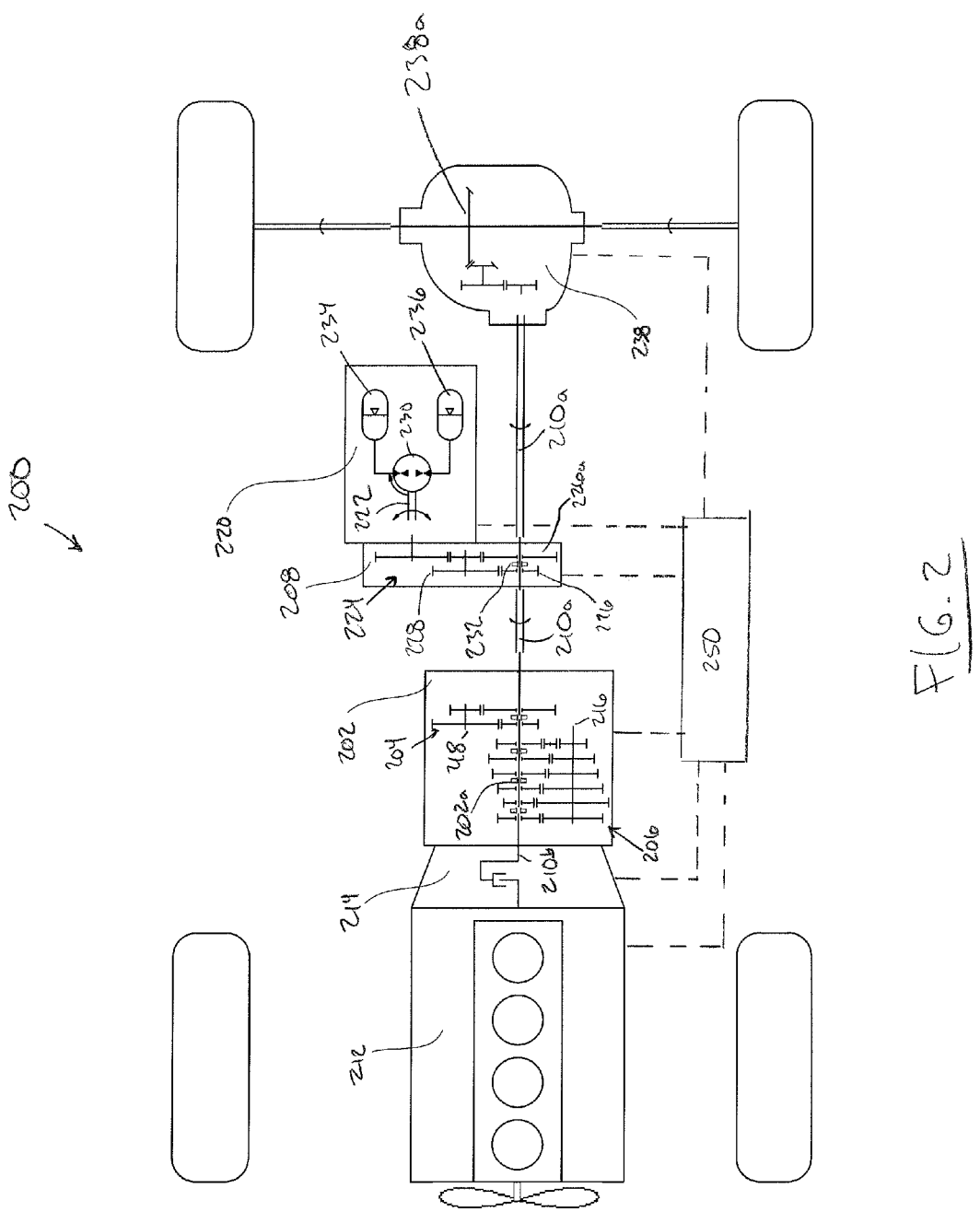
FIG. 2 depicts another hybrid drivetrain.

In an alternative embodiment, the multiple-ratio axle may be replaced with a multiple ratio gearbox on the hybrid system, or on the transfer case. One such embodiment is depicted in FIG. 2. Most components depicted in FIG. 2 are substantially similar to those of FIG. 1 and accordingly, are not further described. Notably, however, the hybrid drivetrain 200 depicted in FIG. 2 includes a single speed differential 238 that includes only one gear 238a. Conversely, the transfer case 208 includes a modified gear set 224 that includes an additional transfer gear 226a having a different ratio than first transfer gear 226. In that regard, two different gear ratios are still available to the alternative hybrid drivetrain 200, even in the absence of a multiple-ratio differential. In yet another embodiment, a multiple-ratio axle and a multiple-ratio gearbox may be utilized together. Utilizing both torque transfer arrangements, each having first and second torque ratios may further improve performance of the drivetrain.

Control of the AMT, hybrid device, and multiple-ratio axle is accomplished via an electronic control unit (ECU) 150 with embedded control code. The ECU 150 electrically commands the solenoids in the system, as well as external devices such as the vehicle engine 112. Various rotational speed, pressure, torque, or other sensors located throughout the system 100 and the vehicle communicate with the ECU 150 to help control the system 100. The embedded control logic selects the appropriate transmission gear ratio and axle ratio based on the determined output torque requirement and the torque available from the hybrid system 120.

As used herein, the "torque ratio" of a torque transfer arrangement is the ratio between the torque input at an input of the torque transfer arrangement and the torque output at an output of the torque transfer arrangement (torque at input/torque at output). As used herein, the "speed ratio" of a torque transfer arrangement is the ratio between a rotational speed at an input shaft of the torque transfer arrangement and the rotational speed at an output shaft of the torque transfer arrangement (speed at input/speed at output). It will be appreciated that the torque ratio and the speed ratio are inversely related. In certain embodiments, within a given torque transfer arrangement, different torque and speed ratios can be provided by selectively using gear sets having different gear ratios.

Figure 3:
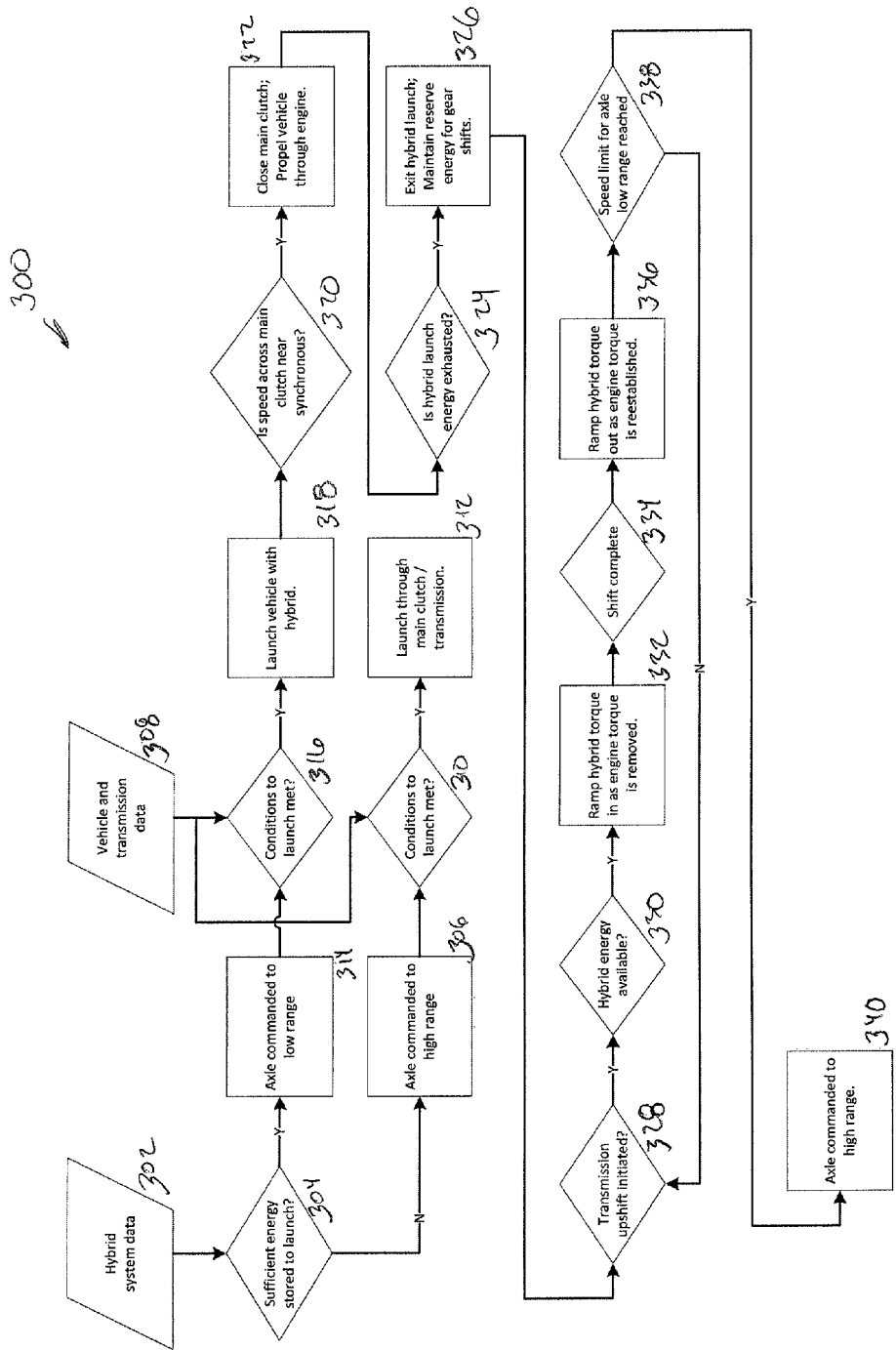
FIG. 3 depicts a logic control diagram for a hybrid drivetrain.

FIG. 3 depicts a control logic sequence for a hybrid drivetrain 300. The hybrid system data is first processed by the ECU (Step 302). This system data is collected from the various sensors that are utilized throughout the vehicle and drivetrain. Thereafter, the ECU software determines whether there is sufficient energy stored in the accumulator to launch the vehicle (Step 304). If not, the differential axle is commanded to the high range (Step 306) and additional vehicle and transmission data is collected from the sensors (Step 308). Of course, if the drivetrain includes the multiple-ratio gear set in the transfer case, as depicted in FIG. 2) the gear set would be commanded to the high range. The system next determines if launch conditions are met. In certain embodiments, this may simply require a signal from vehicular sensors that the driver has released the brake and pressed the gas pedal. Other signals, such as failure codes or diagnostics, indicative of launch conditions are contemplated. Once the conditions to launch are met (Step 310), the drivetrain launches the vehicle via the main clutch and transmission only (Step 312). Failure to meet the required launch conditions may result in a failure indication being sent to the driver. Once launched via the transmission and main clutch, the control system may operate as a standard (i.e., non-hybrid) AMT, assuming a critical failure of the hybrid system. Alternatively, the control system may proceed to Step 328 and utilize the hybrid system during a shift sequence. In another embodiment, the system may operate as a non-hybrid AMT until sufficient energy is gained in the hybrid device (e.g., due to deceleration of the vehicle).

Returning to Step 304, if sufficient energy is stored in the accumulator to launch the vehicle, the differential axle is commanded to the low range (Step 314). Additional vehicle and transmission data is again collected (Step 308) and the ECU confirms that conditions to launch are met (Step 316). If the conditions are met, the vehicle is launched solely with the hybrid device (i.e., via the energy stored in the high pressure accumulator) (Step 318). The control system then determines if the speed across the main clutch is near synchronous (Step 320). If so, the main clutch is engaged so as to propel the vehicle under engine power (Step 322). The system continues to monitor the hybrid device to determine if launch energy is exhausted (Step 324). This monitoring may include detecting a pressure of the hydraulic fluid within the high pressure accumulator. In one embodiment, predetermined minimum launch pressures and shift pressures are set and stored in the ECU. If the hybrid launch energy is exhausted, the system exits hybrid launch mode, maintaining any reserve energy for the shift sequence (Step 326), described below.

The shift sequence begins at Step 328. Signals sent from various sensors enable the ECU to determine if a transmission upshift is being initiated (Step 328). Thereafter, the system determines if hybrid energy is available (Step 330). In one embodiment, this may include accessing data stored after Step 326, where information regarding reserve energy was stored after launch. As indicated above, this step may include confirming a minimum required shift pressure is available from the high pressure accumulator. As engine torque is removed (due to disengagement of clutch), hybrid torque is ramped up (Step 332). This may be accomplished by changing the displacement of the pump by, for example, adjusting a swash plate in the pump. Once the shift is complete (Step 334), hybrid torque is ramped out (again, by adjusting the pump swash plate) as engine torque is reestablished through engagement with the clutch (Step 336). If sensors indicate that the speed limit for the axle (or transfer gear set) low range is not yet reached (Step 338), the system returns to Step 328, to await another upshift. If the speed limit is exceeded, the rear differential (or transfer gear set) is commanded to high range (Step 340). Thereafter, the system may return to Step 328 to await another upshift.

Additionally, the ECU may be loaded with the necessary software or firmware required for use of the system. In alternative configurations, software may be included on various types of storage media (CDs, DVDs, USB drives, etc.) for upload to a standard PC, if the PC is used in conjunction with the system as a user or service interface. Additionally, website addresses and passwords may be included for programs to be downloaded from a website on the internet.

The control algorithm technology described herein can be realized in hardware, software, or a combination of hardware and software. The technology described herein can be realized in a centralized fashion in one computer system or in a distributed fashion where different elements are spread across several interconnected computer systems. Additionally, the control system may be incorporated into the vehicle's main computer system. Any kind of computer system or other apparatus adapted for carrying out the methods described herein is suitable. A typical combination of hardware and software would be stand-alone device integrated into the engine control system that, when loaded and executed, controls the device such that it carries out the methods described herein. Since the technology is contemplated to be used on a transit mixer, a stand-alone hardware system including any necessary operator interfaces (system power, override, etc.) is desirable. As described above, diagnostic or maintenance functions may be loaded onto a separate PC, either stationary at a repair facility or on a laptop or other portable device.

The technology described herein also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A hybrid drivetrain for a motor vehicle, the hybrid drivetrain comprising:
    an automated mechanical transmission having an input shaft, an output shaft, and a countershaft, the automated mechanical transmission also including a first gear disposed between the input shaft and the countershaft and at least two selectively engageable gear sets disposed between the countershaft and the output shaft;
    a master clutch for selectively coupling the input shaft of the automated mechanical transmission to a main power source so as to deliver power from the main power source to the hybrid drivetrain only when the master clutch couples the input shaft to the main power source;
    an alternative energy source including a motor and an energy storage unit, wherein the alternative energy source comprises only a single point of connection to the automated mechanical transmission;
    a first torque transfer arrangement separate from the engageable gear sets of the automated mechanical transmission for transferring torque from the output shaft of the automated mechanical transmission to the motor when the energy storage unit is being charged and for transferring torque from the motor to the output shaft of the automated mechanical transmission when the energy storage unit is being discharged, wherein the first torque transfer arrangement comprises the single point of connection between the alternative energy source and the automated mechanical transmission;
    an alternative energy source clutch for selectively coupling the first torque transfer arrangement to the output shaft of the automated mechanical transmission; and
    a second torque transfer arrangement for transferring torque from the output shaft of the automated mechanical transmission to a driven axle of the motor vehicle;
    at least one of the first and second torque transfer arrangements having first and second torque transfer ratios, the first and second torque transfer ratios being different from one another.

2. The hybrid drivetrain of claim 1, wherein the second torque transfer arrangement includes the first and second torque transfer ratios, wherein the second torque transfer arrangement includes a differential gear arrangement including at least first and second selectively engageable axle gear sets for transferring torque between the output shaft and the driven axle, and wherein the first and second axle gear sets have first and second different gear ratios that provide the first and second torque transfer ratios.

3. The hybrid drivetrain of claim 1, wherein the first torque ratio is lower than the second torque ratio, wherein the first torque ratio is adapted to provide a higher torque and lower speed to the axle suitable for use in launching the vehicle, and wherein the second torque ratio is adapted to provide a lower torque and a higher speed to the axle suitable for use in driving the vehicle at speeds higher than launch speeds.

4. The hybrid drivetrain of claim 3, further comprising a controller for controlling operation of the hybrid drivetrain, wherein when the vehicle is being launched the controller: a) disengages the master clutch to de-couple the input shaft of the automated mechanical transmission from the power source; b) controls the first or second torque transfer arrangement to provide the first torque ratio; c) engages the alternative energy source clutch to couple the first torque transfer arrangement to the output shaft of the automated mechanical transmission; and d) controls the energy storage unit such that energy from the energy storage unit is discharged from the energy storage unit and used to drive rotation of the output shaft of the automated mechanical transmission.

5. The hybrid drivetrain of claim 4, wherein the controller disengages the alternative energy source clutch and engages the master clutch when a rotational speed of the output shaft of the automated mechanical transmission is within a predetermined range of a rotational speed of an output shaft of the power source.

6. The hybrid drivetrain of claim 5, wherein the controller engages the alternative energy source clutch during shifting of the automated mechanical transmission such that energy from the energy storage unit is used to maintain a rotation speed of the output shaft of the automated mechanical transmission during shifting.

7. The hybrid drive train of claim 6, wherein the second torque transfer arrangement includes the first and second torque transfer ratios, wherein the second torque transfer arrangement includes a differential gear arrangement including at least first and second selectively engageable axle gear sets for transferring torque between the output shaft and the driven axle, and wherein the first and second axle gear sets have first and second different gear ratios that provide the first and second torque transfer ratios.

8. The hybrid drivetrain of claim 1, wherein the motor comprises a hydraulic pump/motor, and wherein the energy storage unit comprises at least one hydraulic accumulator.

9. The hybrid drivetrain of claim 8, wherein the hydraulic accumulator includes first and second hydraulic fluid accumulators fluidly connected to opposite sides of the hydraulic pump/motor, the first accumulator being a higher pressure accumulator as compared to the second accumulator.

10. The hybrid drivetrain of claim 2, wherein the motor comprises a hydraulic pump/motor, and wherein the energy storage unit comprises at least one hydraulic accumulator.

11. A motor vehicle comprising:
a main power source;
a mechanical transmission having an input shaft selectively connected to the main power source, an output shaft, and a plurality of selectively engageable gears located between the input shaft and the output shaft;
a single torque transfer mechanism for transferring energy at least one of to or from the output shaft, the torque transfer mechanism comprising a selectively engageable clutch for engaging the torque transfer mechanism to the output shaft;
an energy storage unit connected to the main power source only at the single torque transfer mechanism, wherein the energy storage unit comprises an accumulator and a pump for charging the accumulator with hydraulic fluid based at least in part on a rotation of the torque transfer mechanism; and
a multiple-ratio axle transversely coupled to the output shaft, wherein the multiple-ratio axle comprises a selectively engageable high ratio gear and a selectively engageable low ratio gear.

12. The motor vehicle of claim 11, wherein the torque transfer mechanism comprises a plurality of gears.

13. The motor vehicle of claim 11, wherein the torque transfer mechanism comprises a drive and sprocket.

14. The motor vehicle of claim 11, wherein the energy storage unit further comprises a low pressure accumulator fluidicily connected to the pump, wherein the low pressure accumulator comprises a hydraulic fluid storage unit.

15. The motor vehicle of claim 14, wherein during a deceleration of the vehicle, the torque transfer mechanism rotates the pump, thereby charging a high pressure accumulator with hydraulic fluid from the low pressure accumulator.

16. The motor vehicle of claim 14, wherein during an acceleration of the vehicle, a high pressure accumulator discharges hydraulic fluid to the low pressure accumulator, thereby causing a rotation of the pump, wherein rotation of the pump actuates torque transfer mechanism to deliver power to the output shaft.

* * * * *